(12) United States Patent
Ramaprasad et al.

(10) Patent No.: US 12,395,424 B2
(45) Date of Patent: *Aug. 19, 2025

(54) APPARATUS, SYSTEM, AND METHOD FOR DETERMINING TRAFFIC LOAD DISTRIBUTIONS IN CONNECTION WITH ROUTES OF HIERARCHICAL FOWARDING INFORMATION BASES

(71) Applicant: Juniper Networks, Inc., Sunnyvale, CA (US)

(72) Inventors: Prashanth Ramaprasad, Sunnyvale, CA (US); Madhu Byrapura Doddegowda, Sunnyvale, CA (US); Ronald Bonica, Sunnyvale, CA (US)

(73) Assignee: Juniper Networks, Inc., Tempe, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/752,191

(22) Filed: Jun. 24, 2024

(65) Prior Publication Data

US 2024/0348548 A1  Oct. 17, 2024

Related U.S. Application Data

(63) Continuation of application No. 17/462,036, filed on Aug. 31, 2021, now Pat. No. 12,047,297, which is a
(Continued)

(51) Int. Cl.
*H04L 45/24* (2022.01)
*H04L 43/0882* (2022.01)
*H04L 43/16* (2022.01)
*H04L 45/00* (2022.01)
*H04L 45/12* (2022.01)
*H04L 47/125* (2022.01)

(52) U.S. Cl.
CPC .......... *H04L 45/24* (2013.01); *H04L 43/0882* (2013.01); *H04L 43/16* (2013.01); *H04L 45/123* (2013.01); *H04L 45/22* (2013.01); *H04L 47/125* (2013.01)

(58) Field of Classification Search
CPC ... H04L 47/125; H04L 43/0882; H04L 43/16; H04L 45/123; H04L 45/22; H04L 45/48; H04L 45/24
See application file for complete search history.

(56) References Cited

U.S. PATENT DOCUMENTS

2015/0312153 A1* 10/2015 Venkataswami ........ H04L 45/02
370/235
2017/0279709 A1* 9/2017 Bonica .................... H04L 45/54

* cited by examiner

*Primary Examiner* — Lan-Huong Truong
(74) *Attorney, Agent, or Firm* — Greenberg Traurig, LLP

(57) ABSTRACT

A disclosed method may include (1) identifying a route installed in a Forwarding Information Base (FIB) of a network device included in a network, (2) identifying a plurality of active paths that lead from the network device to a destination device of the route installed in the FIB, (3) determining a load distribution of the plurality of active paths by calculating a plurality of traffic loads that represent amounts of traffic that traverse from the network device to the destination device via the plurality of active paths, and (4) making a trafficking decision in connection with the plurality of active paths based at least in part on the load distribution of the plurality of active paths. Various other apparatuses, systems, and methods are also disclosed.

20 Claims, 8 Drawing Sheets

Related U.S. Application Data continuation of application No. 16/582,934, filed on Sep. 25, 2019, now Pat. No. 11,159,431.

```
                        FIB Output
                          700
----------------------------------------------------------------
********************************************

MPLS:

Destination: 478239
  Route type: user
  Route reference: 0         Route interface-index: 0
  Multicast RPF nh index: 0
  P2mpidx: 0
  Flags: sent to PFE, rt nh decoupled
  Next-hop type: unilist      Index: 138049  Reference: 1
  Next-hop type: composite    Index: 403     Reference: 2
  Next-hop type: indirect     Index: 138974  Reference: 3
  Nexthop: 1.0.0.3
  Next-hop type: Push 201439, Push 245776(top) Index: 500 Reference: 2
  Load Balance Label: None
  Next-hop interface: ge-0/0/1.0
  Next-hop type: indirect       Index: 1048547  Reference: 3
  Nexthop: 1.0.0.9
  Next-hop type: Push 302459, Push 299791(top) Index: 319 Reference: 2
  Load Balance Label: None
  Next-hop interface: ge-0/0/1.0

APPARATUS, SYSTEM, AND METHOD FOR DETERMINING TRAFFIC LOAD DISTRIBUTIONS IN CONNECTION WITH ROUTES OF HIERARCHICAL FOWARDING INFORMATION BASES

CROSS REFERENCE TO RELATED APPLICATION

This application is a continuation of U.S. application Ser. No. 17/462,036 filed 31 Aug. 2021, the disclosure of which is incorporated in its entirety by this reference. This application is also a continuation of U.S. application Ser. No. 16/582,934 filed 25 Sep. 2019, the disclosure of which is incorporated in its entirety by this reference.

BACKGROUND

Network devices (such as routers and switches) are often used to forward traffic within a network and/or across networks. These network devices may represent and/or form the infrastructure of such networks. In some examples, these network devices may include and/or maintain a hierarchical Forwarding Information Base (FIB) loaded with routes that identify and/or define various paths capable of carrying traffic to different destinations within the network and/or across networks. Some of those paths may be active and carrying traffic at a given time. Others (e.g., backups paths) may be inactive and not currently carrying traffic at the given time.

Unfortunately, traditional networking technologies may be unable to easily distinguish the active paths from the inactive paths within a network. Moreover, traditional networking technologies may be unable to easily determine the traffic load distributions across those active paths within the network. The instant disclosure, therefore, identifies and addresses a need for additional and improved apparatuses, systems, and methods for determining traffic load distributions in connection with routes of hierarchical FIBs.

SUMMARY

As will be described in greater detail below, the instant disclosure generally relates to apparatuses, systems, and methods for determining traffic load distributions in connection with routes of hierarchical FIBs. In one example, a method for accomplishing such a task may include (1) identifying a route installed in a FIB of a network device included in a network, (2) identifying a plurality of active paths that lead from the network device to a destination device of the route installed in the FIB, (3) determining a load distribution of the plurality of active paths by calculating a plurality of traffic loads that represent amounts of traffic that traverse from the network device to the destination device via the plurality of active paths, and (4) making a trafficking decision in connection with the plurality of active paths based at least in part on the load distribution of the plurality of active paths.

Similarly, a system that implements the above-identified method may include a physical processor configured to execute various modules stored in memory. In one example, this system may include and/or execute (1) an identification module that (A) identifies a route installed in a FIB of a network device included in a network and (B) identifies a plurality of active paths that lead from the network device to a destination device of the route installed in the FIB, (2) a computation module that calculates a plurality of traffic loads that represent amounts of traffic that traverse from the network device to the destination device via the plurality of active paths, and (3) a determination module that (A) determines a load distribution of the plurality of active paths by calculating a plurality of traffic loads that represent amounts of traffic that traverse from the network device to the destination device via the plurality of active paths and (B) makes a trafficking decision in connection with the plurality of active paths based at least in part on the load distribution of the plurality of active paths.

Additionally or alternatively, an apparatus that implements the above-identified method may include at least one storage device that stores a FIB. The apparatus may also include at least one physical processor communicatively coupled to the storage device. In one example, the physical processor (1) identifies a route installed in a forwarding information base of a network device included in a network, (2) identifies a plurality of active paths that lead from the network device to a destination device of the route installed in the forwarding information base, (3) determines a load distribution of the plurality of active paths by calculating a plurality of traffic loads that represent amounts of traffic that traverse from the network device to the destination device via the plurality of active paths, and (4) makes a trafficking decision in connection with the plurality of active paths based at least in part on the load distribution of the plurality of active paths.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 7 is an illustration of an exemplary FIB output that identifies a traffic load distribution across multiple active paths of a network.

Figure 1:
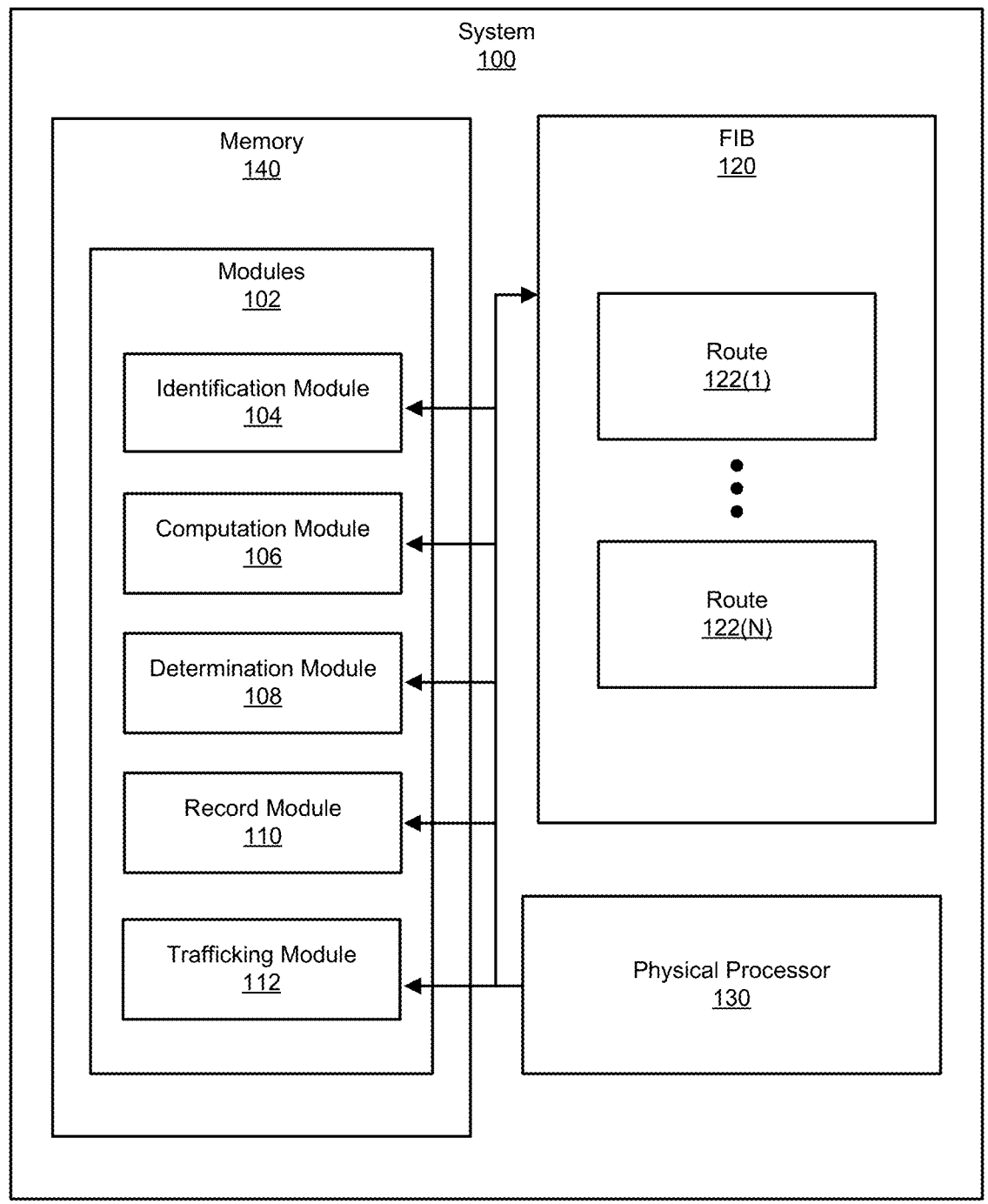
FIG. 1 is a block diagram of an exemplary system for determining traffic load distributions in connection with routes of hierarchical FIBs.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for determining traffic load distributions in connection with routes of hierarchical FIBs. As will be explained in greater detail below, embodiments of the instant disclosure may be able to identify and/or map active paths within networks based at least in part on information maintained and/or stored in FIBs. Additionally or alternatively, embodiments of the instant disclosure may be able to determine and/or calculate the traffic load distributions across the active paths within the network. By doing so, these embodiments may enable network devices to make trafficking decisions (e.g., traffic engineering and/or load-balancing decisions) in connection with the active paths within the network.

Figure 2:
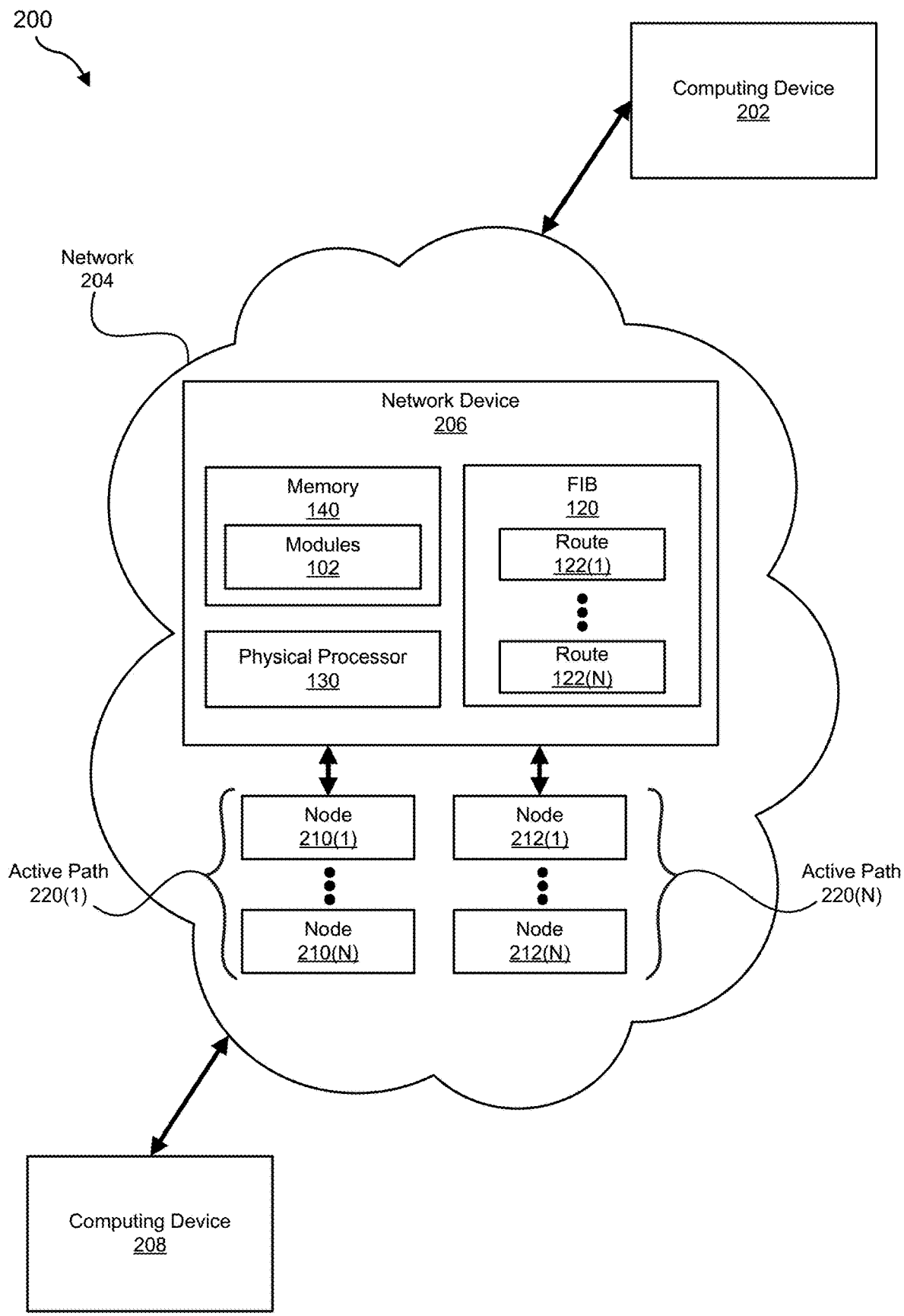
FIG. 2 is a block diagram of an additional exemplary system for determining traffic load distributions in connection with routes of hierarchical FIBs.
Figure 3:
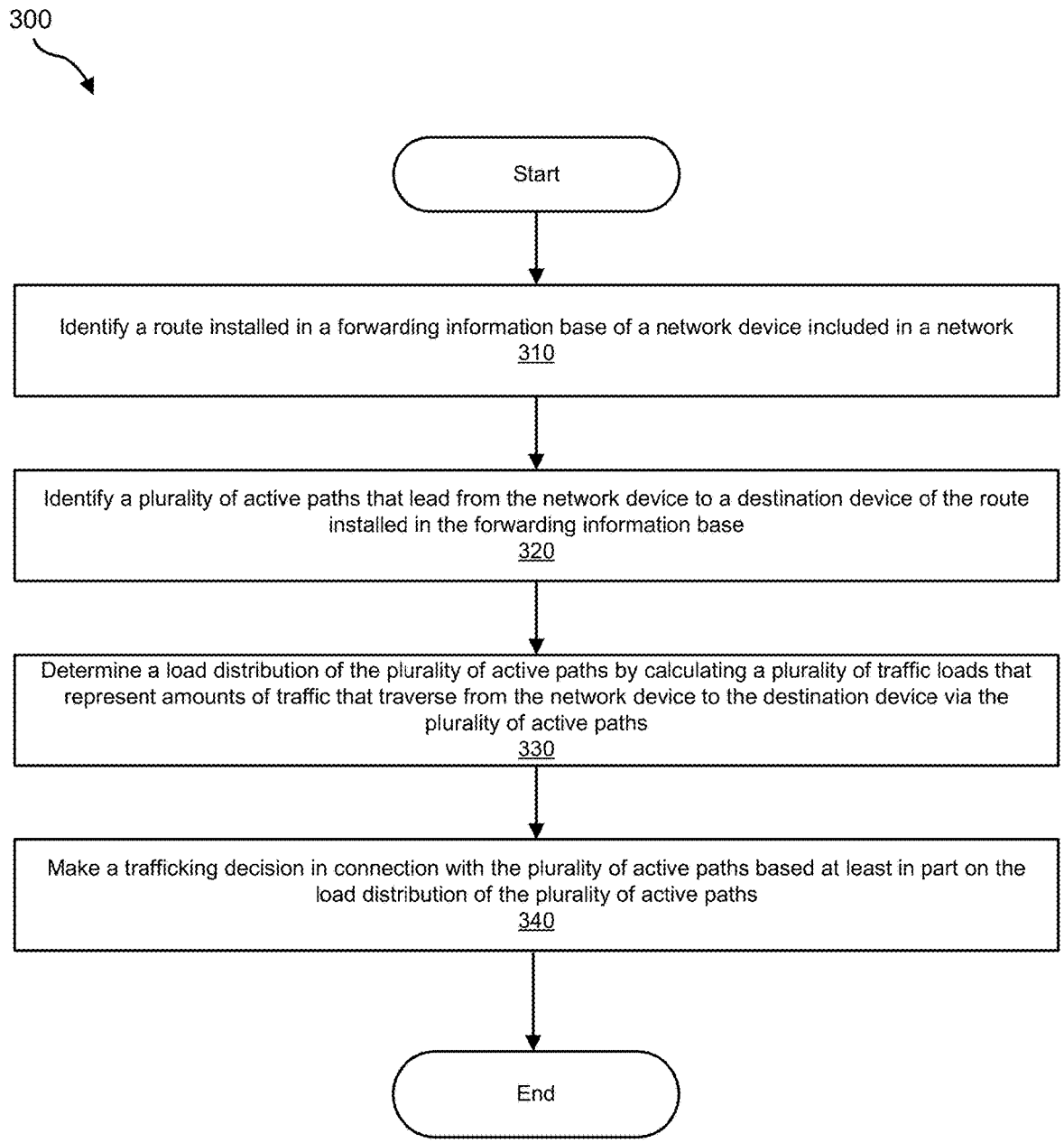
FIG. 3 is a flow diagram of an exemplary method for determining traffic load distributions in connection with routes of hierarchical FIBs.
Figure 4:
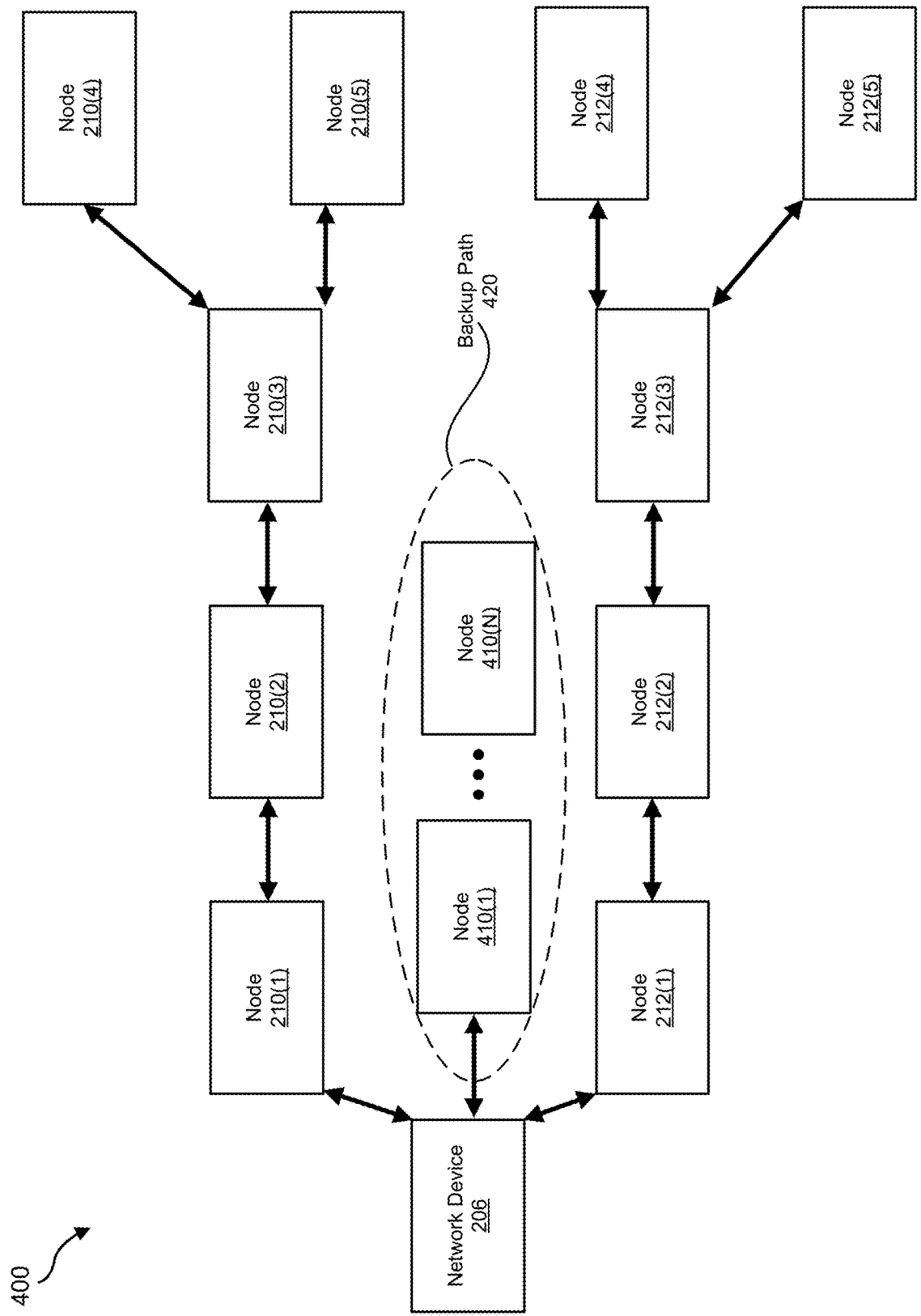
FIG. 4 is a block diagram of an additional exemplary system for determining traffic load distributions in connection with routes of hierarchical FIBs.

The following will provide, with reference to FIGS. 1, 2, and 4 detailed descriptions of exemplary apparatuses, systems, and corresponding implementations for determining traffic load distributions in connection with routes of hierarchical FIBs. Detailed descriptions of exemplary FIB records and/or representations will be provided in connection with FIGS. 5 and 6. Detailed descriptions of an exemplary FIB output will be provided in connection with FIGS. 7. Detailed descriptions of computer-implemented methods for determining traffic load distributions in connection with routes of hierarchical FIBs will be provided in connection with FIG. 3. In addition, detailed descriptions of an exemplary computing system for carrying out these methods will be provided in connection with FIG. 8.

FIG. 1 shows an exemplary system 100 that facilitates determining traffic load distributions in connection with routes of hierarchical FIBs. As illustrated in FIG. 1, system 100 may include one or more modules 102 for performing one or more tasks. As will be explained in greater detail below, modules 102 may include an identification module 104, a computation module 106, a determination module 108, a record module 110, and a trafficking module 112. Although illustrated as separate elements, one or more of modules 102 in FIG. 1 may represent portions of a single module, application, and/or operating system.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 208, network device 206, nodes 210(1)-(N), and/or nodes 212(1)-(N)). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate determining traffic load distributions in connection with routes of hierarchical FIBs. Examples of physical processor 130 include, without limitation, Central Processing Units (CPUs), microprocessors, microcontrollers, Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, exemplary system 100 may further include one or more FIBs, such as FIB 120. In some examples, FIB 120 may include and/or represent an access interface included on and/or incorporated into a gateway device. In some examples, FIB 120 may include and/or represent a forwarding table, forwarding plane, and/or database that stores networking objects that facilitate forwarding traffic within a network. In one example, FIB 120 may be stored, maintained, and/or located within kernel space on a physical computing device. Additionally or alternatively, FIB 120 may be incorporated into, allocated to, and/or represent part of a virtual router. Accordingly, FIB 120 may be hosted by a physical device and/or allocated to a virtual router for use by a network consumer and/or subscriber.

As illustrated in FIG. 1, FIB 120 may include, store, and/or maintain one or more routes, such as routes 122(1)-(N). In some examples, routes 122(1)-(N) may each correspond to and/or represent data and/or information that identifies or refers to a portion of a network, network device, and/or network interface. In one example, routes 122(1)-(N) may each identify and/or represent a path capable of carrying traffic within a network and/or across networks. Additionally or alternatively, routes 122(1)-(N) may include and/or contain data representations of and/or references to one or more physical devices or interfaces (such an "ifd"), logical devices or interfaces (such as an "ifl"), next hops, and/or path segments. Examples of routes 122(1)-(N) include, without limitation, Internet Protocol (IP) routes (such as IPv4 and/or IPv6 routes), Multiprotocol Label Switching (MPLS) routes, Virtual Private Local Area Network Service (VLAN) routes, Border Gateway Protocol (BGP) routes, Open Shortest Path First (OSPF) routes, variations or combinations of one or more of the same, or any other suitable routes.

An apparatus for determining traffic load distributions in connection with routes of hierarchical FIBs may include all or portions of exemplary system 100. In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication between computing devices 202 and 208.

As illustrated in FIG. 2, network 204 may include and/or represent various network devices and/or nodes that form and/or establish communication paths and/or segments. For example, network 204 may include a network device 206 that forwards traffic from computing device 202 along one or more active paths 220(1)-(N) toward computing device 208. In this example, active path 220(1) may include and/or represent nodes 210(1)-(N), and active path 220(N) may include and/or represent nodes 212(1)-(N). In some embodiments, network device 206 may include and/or represent memory 140, physical processor 130, and/or FIB 120.

In some examples, and as will be described in greater detail below, one or more of modules 102 may cause network device 206 to (1) identify route 122(1) installed in FIB 120, (2) identify active paths 220(1)-(N) that lead from network device 206 to a destination device (e.g., computing device 208) of route 122(1) installed in FIB 120, (3) determine a load distribution of active paths 220(1)-(N) by calculating a plurality of traffic loads that represent amounts of traffic that traverse from network device 206 to the destination device via active paths 220(1)-(N), and (4) make a trafficking decision in connection with active paths 220(1)-(N) based at least in part on the load distribution of active paths 220(1)-(N).

Network device 206, nodes 210(1)-(N), nodes 212(1)-(N), computing device 202, and computing device 208 each generally represent any type or form of physical computing device capable of reading computer-executable instructions and/or handling network traffic. Examples of network device 206, nodes 210(1)-(N), nodes 212(1)-(N), computing device 202, and computing device 208 include, without limitation, routers (such as provider edge routers, hub routers, spoke routers, autonomous system boundary routers, and/or area border routers), switches, hubs, modems, bridges, repeaters, gateways (such as Broadband Network Gateways (BNGs)), multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable gateway devices.

Network 204 generally represents any medium or architecture capable of facilitating communication or data transfer. In one example, network 204 may include computing devices 202 and 208 even though these devices are illustrated as being external to network 204 in FIG. 2. Additionally or alternatively, network 204 may include other devices that facilitate communication among network device 206, nodes 210(1)-(N), nodes 212(1)-(N), computing device 202, and computing device 208. Network 204 may facilitate communication or data transfer using wireless and/or wired connections. Examples of network 204 include, without limitation, an intranet, an access network, a layer 2 network, a layer 3 network, a Multiprotocol Label Switching (MPLS) network, an IP network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an exemplary computer-implemented method 300 for determining traffic load distributions in connection with routes of hierarchical FIBs. The steps shown in FIG. 3 may be performed by any suitable computer-executable code and/or computing system, including system 100 in FIG. 1, system 200 in FIG. 2, system 400 in FIG. 4, system 800 in FIG. 8, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a route installed in a FIB of a network device included in a network. For example, receiving module 104 may, as part of network device 206 in FIG. 2, identify route 122(1) in FIB 120. In this example, route 122(1) may identify, define, and/or correspond to one or more active paths that lead from network device 206 to computing device 208 via network 204.

The systems described herein may perform step 310 in a variety of ways and/or contexts. In some examples, identification module 104 may search FIB 120 for one or more routes. For example, identification module 104 may search FIB 120 for any routes that lead to computing device 208. During the search, identification module 104 may identify and/or find route 122(1), which leads from network device 206 to computing device 208 via one or more active paths within network 204.

Returning to FIG. 3, at step 320 one or more of the systems described herein may identify a plurality of active paths that lead from the network device to a destination device of the route installed in the FIB. For example, identification module 104 may, as part of network device 206 in FIG. 2, identify active paths 220(1)-(N) as leading from network device 206 to computing device 208. In this example, active paths 220(1)-(N) may each include and/or represent a series of nodes and/or links that are currently carrying traffic from network device 206 to computing device 208.

As will be described in greater detail below, network 204 may also include one or more inactive (e.g., backup) paths that lead from network device 206 to computing device 208. In some embodiments, such inactive paths may not be currently carrying traffic from network device 206 to computing device 208. In such embodiments, the inactive paths may be configured to stand by and/or back up active paths 220(1)-(N) in the event of a failure and/or malfunction.

The systems described herein may perform step 320 in a variety of ways and/or contexts. In some examples, identification module 104 may search FIB 120 for information that identifies each node included in active paths 220(1)-(N). During the search, identification module 104 may locate and/or find information that identifies nodes 210(1)-(N) as being part of active path 220(1). Additionally or alternatively, during the search, identification module 104 may locate and/or find information that identifies nodes 212(1)-(N) as being part active path 220(N).

As a specific example, identification module 104 may search FIB 120 by entering "show route forwarding-table [destination label] extensive" as a command and/or parameter into FIB 120, a corresponding interface, and/or a corresponding search portal. In this example, FIB 120, the corresponding interface, and/or the corresponding search portal may return FIB output 700 in FIG. 7. As illustrated in FIG. 7, FIB output 700 may include and/or contain information about one or more active paths that lead from network device 206 to the destination device associated with label "478239".

In some examples, identification module 104 may search FIB 120 by entering commands and/or parameters that identify specific output fields, "detail" keywords, and/or "extensive" keywords. Examples of such commands and/or parameters include, without limitation, "show route forwarding-table", "show route forwarding-table detail", "show route forwarding-table destination extensive", "show route forwarding-table extensive", "show route forwarding-table family mpls", "show route forwarding-table family mpls ccc", "show route forwarding-table family vpls", "show route forwarding-table family vpls extensive", "show route forwarding-table table default", "show route forwarding-table table logical-system-name/routing-instance-name", "show route forwarding-table vpn", "show pfe route ip prefix detail", "show pfe route destination label", combinations or variations of one or more of the same, and/or any other suitable commands and/or parameters.

FIG. 4 illustrates an exemplary system 400 that includes various paths that lead from network device 206. As illustrated in FIG. 4, one path leading from network device 206 may include and/or represent nodes 210(1), 210(2), 210(3), 210(4), and/or 210(5). In one example, one or more of nodes 210(1)-(5) may form, establish, and/or represent active path 220(1). Another path leading from network device 206 in FIG. 4 may include and/or represent nodes 212(1), 212(2), 212(3), 212(4), and/or 212(5). In one example, one or more of nodes 212(1)-(5) may form, establish, and/or represent active path 220(N).

As illustrated in FIG. 4, system 400 may also include a backup path 420 that leads from network device 206. In one example, backup path 420 may include and/or represent nodes 410(1)-(N) that facilitate and/or provide failover protection in the event that one or more of active paths 220(1)-(N) experience a failure and/or malfunction. In that case, backup path 420 may be activated and then carry at least a portion of the traffic heading toward computing device 208 (not illustrated in FIG. 4).

Accordingly, identification module 104 may discover and/or find, within FIB 120, information that identifies one or more of nodes 210(1)-210(5) as being part of active path 220(1) in FIG. 4. Similarly, identification module 104 may discover and/or find, within FIB 120, information that identifies one or more of nodes 212(1)-212(5) as being part of active path 220(N) in FIG. 4. Additionally or alternatively, identification module 104 may discover and/or find, within FIB 120, information that identifies nodes 410(1)-410(N) as being part of backup path 420 in FIG. 4.

In some examples, identification module 104 may access, in FIB 120, one or more unilist entries and/or records that identify and/or describe a list of next hops included in active paths 220(1)-(N). In such examples, identification module 104 may then identify and/or determine the next hops included in active paths 220(1)-(N) by analyzing the unilist entries and/or records accessed in FIB 120. Additionally or alternatively, the unilist entries and/or records may identify each node included in active paths 220(1)-(N). Accordingly, identification module 104 and/or determination module 108 may determine each node included in active paths 220(1)-(N) by analyzing the unilist entries and/or records accessed in FIB 120.

Figure 5:
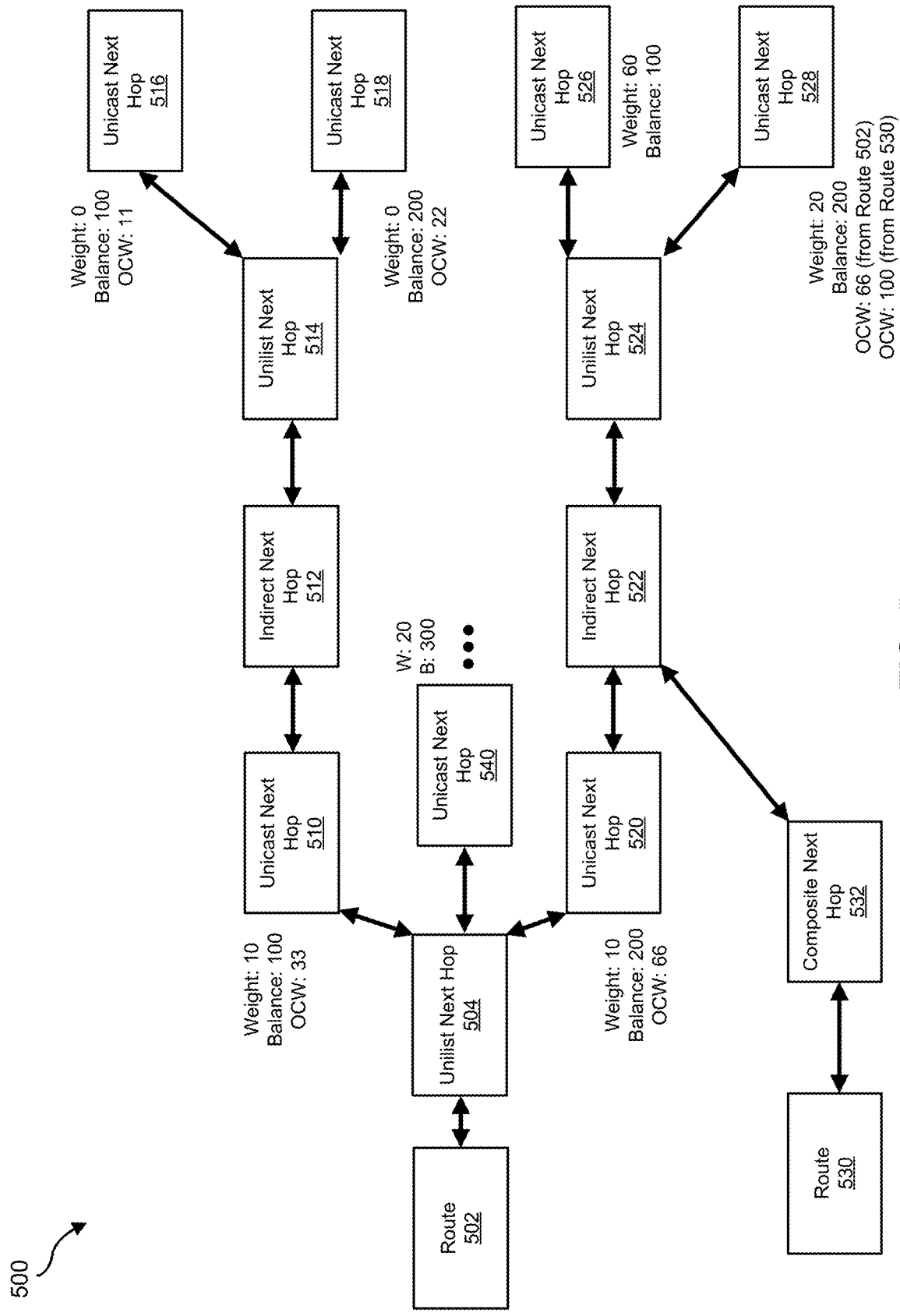
FIG. 5 is an illustration of an exemplary FIB record that identifies a traffic load distribution across multiple active paths of a network.

In some examples, record module 110 may generate a representation of the load distribution across active paths 220(1)-(N) based at least in part on the information found within FIB 120. FIG. 5 illustrates an exemplary representation 500 of the load distribution across active paths 220(1)-(N) that lead from network device 206 to computing device 208. In some examples, representation 500 may correspond to and/or represent the load distributed across system 400 in FIG. 4 within FIB 120. For example, unicast next hops 510, 520, and 540 in FIG. 5 may correspond to and/or represent nodes 210(1), 212(1), and 410(1), respectively, in FIG. 4. Similarly, unilist next hop 514 in FIG. 5 may correspond to and/or represent nodes 210(3) and 212(3), respectively, in FIG. 4.

In one example, representation 500 may be embodied, defined, and/or described in a record and/or entry of FIB 120. As illustrated in FIG. 5, representation 500 may include and/or identify a route 502 of FIB 120. In one example, route 502 may identify a unilist next hop 504 of network device 206. In this example, unilist next hop 504 may represent and/or denote a divergence to either a unicast next hop 510 of path 220(1) or a unicast next hop 520 of path 220(N). Accordingly, traffic sent to unilist next hop 504 may traverse and/or travel to either unicast next hop 510 or unicast next hop 520.

Continuing with this example, route 502 may also identify an indirect next hop 512 that follows unicast next hop 510 along active path 220(1). In this example, route 502 may further identify a unilist next hop 514 that follows indirect next hop 512 along active path 220(1). As illustrated in FIG. 5, unilist next hop 514 may represent and/or denote a divergence to either a unicast next hop 516 or a unicast next hop 518. Accordingly, traffic sent to unilist next hop 514 may traverse and/or travel to either unicast next hop 516 or unicast next hop 518.

Continuing with this example, route 502 may additionally identify an indirect next hop 522 that follows unicast next hop 520 along active path 220(N). In this example, route 502 may further identify a unilist next hop 524 that follows indirect next hop 522 along active path 220(1). As illustrated in FIG. 5, unilist next hop 524 may represent and/or denote a divergence to either a unicast next hop 526 or a unicast next hop 528. Accordingly, traffic sent to unilist next hop 524 may traverse and/or travel to either unicast next hop 526 or unicast next hop 528.

In some examples, each of unicast next hops 516, 518, 526, and 528 may lead to computing device 208. In other words, each of unicast next hops 516, 518, 526, and 528 may have the capacity and/or capability to forward traffic toward computing device 208. Accordingly, traffic originating from network device 206 and heading toward computing device 208 may be distributed and/or load-balanced across next hops 516, 518, 526, and 528.

In some examples, representation 500 may also include and/or identify one or more additional paths that lead from network device 206 to computing device. As illustrated in FIG. 5, representation 500 may include and/or identify a route 530 of FIB 120. In one example, route 530 may identify a composite next hop 532 of network device 206. In this example, route 530 may also identify an indirect next hop 522 that follows composite next hop 532 along active path 220(N).

Continuing with this example, route 530 may further identify a unilist next hop 524 that follows indirect next hop 522 along active path 220(N). As illustrated in FIG. 5, unilist next hop 524 may represent and/or denote a divergence to either a unicast next hop 526 or a unicast next hop 528. Accordingly, traffic sent to unilist next hop 524 may traverse and/or travel to either unicast next hop 526 or unicast next hop 528.

Returning to FIG. 3, at step 330 one or more of the systems described herein may determine a load distribution of the plurality of active paths by calculating a plurality of traffic loads that represent amounts of traffic that traverse from the network device to the destination device via the plurality of active paths. For example, computation module 106 may, as part of network device 206 in FIG. 2, calculate traffic loads that traverse from network device 206 to computing device 208 via active paths 220(1)-(N). In this example, the traffic loads may represent the respective amounts of traffic carried by active paths 220(1)-(N).

In addition, determination module 108 may, as part of network device 206 in FIG. 2, determine the load distribution of active paths 220(1)-(N) based at least in part on the calculated traffic loads. In one example, the load distribution may include and/or represent the collection of traffic loads that traverse from network device 206 to computing device 208.

The systems described herein may perform step 330 in a variety of ways and/or contexts. In some examples, computation module 106 may calculate the traffic loads based at least in part on the weight and/or balance values associated with certain nodes included in active paths 220(1)-(N). For example, identification module 104 may access and/or obtain information that identifies a weight value and/or a balance value for each unilist node included active paths 220(1)-(N) from FIB 120. More specifically, identification module 104 may access and/or obtain one or more unilist entries and/or records that identify a weight value and/or a balance value for each unilist node included active paths 220(1)-(N) from FIB 120. These unilist entries and/or records may indicate and/or identify weight and/or balance values associated with unilist next hops 504, 514, and/or 524 in FIG. 5.

In one example, the weight value may indicate and/or be used to distinguish active paths from inactive paths. Additionally or alternatively, the balance value may indicate and/or be used to determine how traffic of unequal cost is distributed across different next hops included in active paths under unequal-cost load balancing.

As a specific example, identification module 104 may access and/or obtain unilist next hop 504 in FIG. 5. In this example, unilist next hop 504 may indicate and/or identify weight values of 10, 10, and 20 for unicast next hops 510, 520, and 540, respectively. Additionally or alternatively, unilist next hop 504 may indicate and/or identify balance values of 100, 200, and 300 for unicast next hops 510, 520, and 540, respectively.

In one example, identification module 104 may identify the weight values of 10, 10, and 20 for unicast next hops 510, 520, and 540, respectively, by analyzing unilist next hop 504. In this example, determination module 110 may compare the weight values of 10 and 10 for unicast next hops 510 and 520 to the weight value of 20 for unicast next hop 540. Determination module 110 may then determine that the weight value for unicast next hop 540 differs from the weight values for unicast next hops 510 and 520 based at least in part on the comparison.

In one example, the lowest weight may correspond to and/or indicate any active paths and/or nodes included in those active paths. Conversely, the highest weight may correspond to and/or indicate any inactive paths and/or nodes included in those inactive paths. In this example, determination module 110 may determine that the weight values for unicast next hop 510 and 520 are less than the weight value for unicast next hop 540 based at least in part on the comparison. As a result, determination module 110 may then determine that unicast next hop 540 is included in an inactive path that is not currently carrying any traffic from network device 206 to computing device 208. Accordingly, determination module 110 may determine that active paths 220(1) and 220(N) are active and backup path 420 is inactive.

Continuing with this example, identification module 104 may identify the weight values of 0 and 0 for unicast next hops 516 and 518, respectively, by analyzing unilist next hop 514. In this example, determination module 110 may compare the weight value of 0 for unicast next hop 516 to the weight value of 0 for unicast next hop 518. Determination module 110 may then determine that the weight value for unicast next hop 516 is the same as the weight value for unicast next hop 518 based at least in part on the comparison. As a result, determination module 110 may then determine that the paths and/or segments that originate at unicast next hops 516 and 518 are both active path and currently carrying at least some traffic from network device 206 to computing device 208.

Further with this example, identification module 104 may identify the weight values of 60 and 20 for unicast next hops 526 and 528, respectively, by analyzing unilist next hop 524. In this example, determination module 110 may compare the weight value of 60 for unicast next hop 526 to the weight value of 20 for unicast next hop 528. Determination module 110 may then determine that the weight value for unicast next hop 526 differs from the weight value for unicast next hop 528 based at least in part on the comparison. More specifically, determination module 110 may determine that the weight value for unicast next hop 528 is less than the weight value for unicast next hop 526 based at least in part on the comparison. Determination module 110 may then determine that unicast next hop 526 is included in an inactive path that is not currently carrying any traffic from network device 206 to computing device 208.

In some examples, computation module 106 may calculate the traffic loads handled by node 210(1) and node 212(2) in FIG. 4 in connection with route 502 based at least in part on their corresponding balance values. In one example, computation module 106 may apply the following formula for the Overall Computed Weight (OCW) at a particular node within an active path:

$$OCW = \text{Incoming Propagated Traffic Ratio } (PTR) \times \frac{\text{Balance Value of Active Path}}{\text{Sum of Balance Values of Active Paths}}.$$

In this example, the OCW may correspond to and/or represent the percentage and/or amount of traffic that traverses and/or travels through a certain active path, segment, and/or node.

For example, the PTR at unilist next hop 504 may be initialized to 100 such that the incoming PTR for each of unicast next hops 510 and 520 is 100. Accordingly, in this example, the OCW for unicast next hop 510 may be calculated as $$OCW = 100 \times \frac{100}{(100 + 200)} \cong 33,$$

meaning that approximately 33 percent of all packets forwarded from network device 206 via route 502 traverse through and/or are handled by unicast next hop 510. Additionally in this example, the OCW for unicast next hop 520 may be calculated as $$OCW = 100 \times \frac{200}{(100 + 200)} \cong 66,$$

meaning that approximately 66 percent of all packets forwarded from network device 206 via route 502 traverse through and/or are handled by unicast next hop 520.

In some examples, computation module 106 may calculate the traffic loads handled by node 210(4) and node 210(5) in FIG. 4 in connection with route 502 based at least in part on their corresponding balance values. For example, the incoming PTR for unicast next hops 516 and 518 may correspond and/or amount to the OCW of unicast next hop 510, which is the first node of the leg, branch, and/or segment that feeds into unilist next hop 514 where that active path splits into unicast next hops 516 and 518. Accordingly, in this example, the OCW for unicast next hop 516 may be calculated as $$OCW = 33 \times \frac{100}{(100 + 200)} \cong 11,$$

meaning that approximately 11 percent of all packets forwarded from network device 206 via route 502 traverse through and/or are handled by unicast next hop 516. Additionally in this example, the OCW for unicast next hop 518 may be calculated as $$OCW = 33 \times \frac{200}{(100 + 200)} \cong 22,$$

meaning that approximately 22 percent of all packets forwarded from network device 206 via route 502 traverse through and/or are handled by unicast next hop 518.

In some examples, computation module 106 may calculate the traffic loads handled by node 212(5) in FIG. 5 in connection with route 502. For example, the incoming PTR for unicast next hop 528 may correspond and/or amount to the OCW of unicast next hop 520, which is the first node of the leg, branch, and/or segment that feeds into unilist next hop 524 where that path splits into unicast next hops 526 and 528. However, because the path segment that includes unicast next hop 526 is inactive, all the traffic that traverses and/or is handled by unicast next hop 520 in connection with route 502 may continue onward toward computing device 208 via unicast next hop 528. Accordingly, the OCW for unicast next hop 528 in connection with route 502 may be calculated as $$OCW = 66 \times \frac{200}{(200)} \cong 66,$$

meaning that approximately 66 percent of all packets forwarded from network device 206 via route 502 traverse through and/or are handled by unicast next hop 528.

In some examples, computation module 106 may calculate the traffic load handled by node 212(5) in FIG. 5 in connection with route 530. For example, the PTR at unilist next hop 524 may be initialized to 100 such that the incoming PTR for unicast next hop 528 is 100. As mentioned above, because the path segment that includes unicast next hop 526 is inactive, all the traffic that originates from network device 206 in connection with route 530 may continue onward toward computing device 208 via unicast next hop 528. Accordingly, the OCW for unicast next hop 528 in connection with route 530 may be calculated as $$OCW = 100 \times \frac{200}{(200)} \cong 100,$$

meaning that 100 percent of all packets forwarded from network device 206 via route 530 traverse through and/or are handled by unicast next hop 528.

In some examples, record module 110 may generate representation 500 of the load distribution across system 400 and/or store the same in FIB 120 for future reference. In these examples, representation 500 may indicate and/or show the various weight values, balance values, and/or OCWs associated with routes 502 and/or 530.

Figure 6:
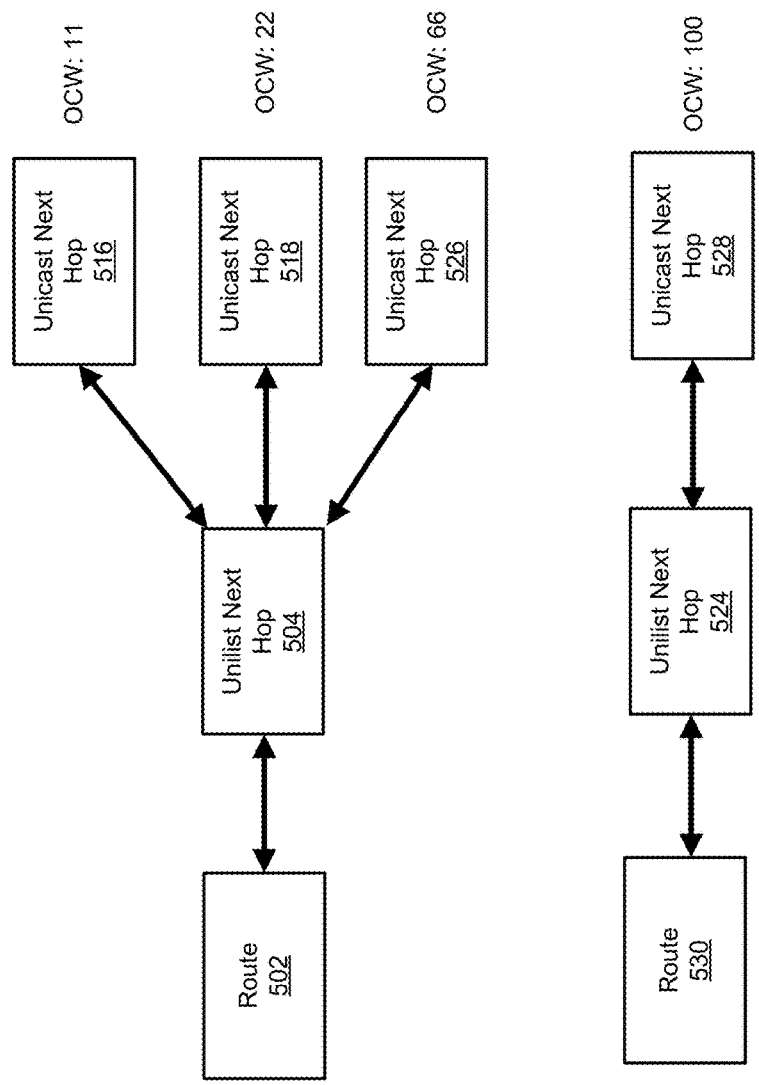
FIG. 6 is an illustration of an exemplary abridged FIB record that identifies a traffic load distribution across multiple active paths of a network.

Additionally or alternatively, record module 110 may generate an abridged representation 600 in FIG. 6 of the load distribution across system 400 and/or store the same in FIB 120 for future reference. As illustrated in FIG. 6, abridged representation 600 may include and/or represent an abbreviated version of representation 500. In one example, abridged representation 600 may account for and/or show route 502, unilist next hop 504, and/or unicast next hops 516, 518, 526. In this example, abridged representation 600 may omit next hops 510, 512, 514, 520, 522, 524, 526, and 540, which are accounted for and/or shown in representation 500.

Additionally or alternatively, abridged representation 600 may account for and/or show route 530, unilist next hop 524, and/or unicast next hop 528. In this example, abridged representation 600 may further omit next hops 532, which is accounted for and/or shown in representation 500.

Abridged representation 600 may be generated in a variety of ways. For example, identification module 104 may identify routes 502 and 530. In this example, identification module 104 may then identify next hops 516, 518, and/or 528 as the final hops in the active paths of route 502. Further, identification module 104 may identify unilist next hop 504 that leads to and/or feeds traffic to next hops 516, 518, and/or 528 in connection with route 502.

Additionally or alternatively, identification module 104 may identify next hop 528 as the final hop in the active path of route 530. In this example, identification module 104 may identify unilist next hop 524 that leads to and/or feeds traffic to next hop 528 in connection with route 530.

Continuing with this example, record module 110 may generate abridged representation 600 to account for and/or show route 502 as leading to next hops 516, 518, and/or 528 via unilist next hop 504 and route 530 as leading to next hop 528 via unilist next hop 524. In this example, record module 110 may generate abridged representation 600 to omit next hops 510, 512, 514, 520, 522, 524, 526, 532, and 540. Further, abridged representation 600 may indicate and/or show the various OCWs associated with routes 502 and/or 530.

Returning to FIG. 3, at step 340 one or more of the systems described herein may make a trafficking decision in connection with the plurality of active paths based at least in part on the load distribution of the plurality of active paths.

For example, trafficking module 112 may, as part of network device 206 in FIG. 2, make a trafficking decision in connection with active paths 220(1)-(N) based at least in part on the load distribution of active paths 220(1)-(N). In one example, the trafficking decision may include and/or represent a load-balancing decision for active paths 220(1)-(N). Additionally or alternatively, the trafficking decision may include and/or represent a traffic engineering decision for active paths 220(1)-(N).

The systems described herein may perform step 340 in a variety of ways and/or contexts. In some examples, determination module 108 may determine that at least portion of the load distribution of active paths 220(1)-(N) exceeds a certain threshold. For example, determination module 108 may determine that active path 220(N) is currently carrying a disproportionately large amount of the traffic in connection with route 502 relative to active path 220(1). In response to this determination, trafficking module 112 may modify the load distribution of active paths 220(1)-(N) by increasing the amount of traffic handled by at least one of active paths 220(1)-(N) and decreasing the amount of traffic handled by at least another one of active paths 220(1)-(N).

In some examples, determination module 108 may determine that a current state of the load distribution of active paths 220(1)-(N) complies with a certain threshold. For example, determination module 108 may determine that active paths 220(1)-(N) are currently carrying acceptable amounts of traffic in connection with route 502 relative to one another. In response to this determination, trafficking module 112 may maintain the load distribution of active paths 220(1)-(N) in the current state.

In some examples, trafficking module 112 may make the trafficking decision based at least in part on and/or in view of representation 500 in FIG. 5. Additionally or alternatively, trafficking module 112 may make the trafficking decision based at least in part on and/or in view of abridged representation 600 in FIG. 6. For example, trafficking module 112 may access and/or obtain abridged representation 600 in FIG. 6 from FIB 120. In this example, trafficking module 112 may analyze abridge representation 600 and then rely on the information presented in abridged representation 600 in FIG. 6 in making the trafficking decision.

In some examples, trafficking module 112 may execute and/or perform the trafficking decision. For example, trafficking module 112 may reroute traffic from route 502 to another route in view of the load distribution of active paths 220(1)-(N). Additionally or alternatively, trafficking module 112 may redistribute the traffic loads across certain paths and/or segments implicated by route 502.

Figure 8:
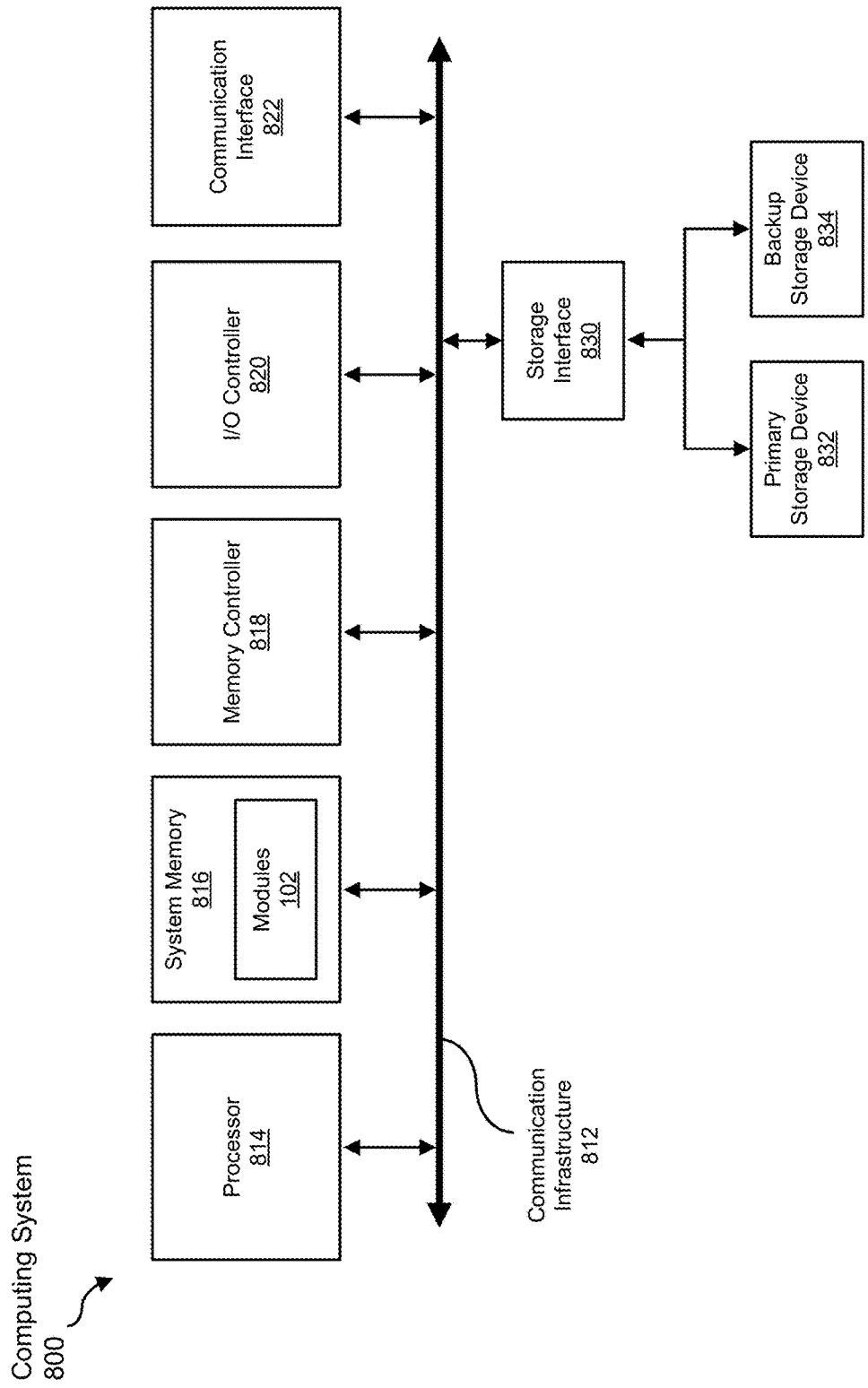
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of computing system 800 may perform and/or be a means for performing, either alone or in combination with other elements, one or more of the steps described in connection with FIG. 3. All or a portion of computing system 800 may also perform and/or be a means for performing and/or implementing any other steps, methods, or processes described and/or illustrated herein.

Computing system 800 broadly represents any type or form of electrical load, including a single or multi-processor computing device or system capable of executing computer-readable instructions. Examples of computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 800 may be programmed, configured, and/or otherwise designed to comply with one or more networking protocols. According to certain embodiments, computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 800 may include various network and/or computing components. For example, computing system 800 may include at least one processor 814 and a system memory 816. Processor 814 generally represents any type or form of processing unit capable of processing data or interpreting and executing instructions. For example, processor 814 may represent an application-specific integrated circuit (ASIC), a system on a chip (e.g., a network processor), a hardware accelerator, a general purpose processor, and/or any other suitable processing element.

Processor 814 may process data according to one or more of the networking protocols discussed above. For example, processor 814 may execute or implement a portion of a protocol stack, may process packets, may perform memory operations (e.g., queuing packets for later processing), may execute end-user applications, and/or may perform any other processing tasks.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 800 may include both a volatile memory unit (such as, for example, system memory 816) and a non-volatile storage device (such as, for example, primary storage device 832, as described in detail below). System memory 816 may be implemented as shared memory and/or distributed memory in a network device. Furthermore, system memory 816 may store packets and/or other information used in networking operations.

In certain embodiments, exemplary computing system 800 may also include one or more components or elements in addition to processor 814 and system memory 816. For example, as illustrated in FIG. 8, computing system 800 may include a memory controller 818, an Input/Output (I/O)

controller 820, and a communication interface 822, each of which may be interconnected via communication infrastructure 812. Communication infrastructure 812 generally represents any type or form of infrastructure capable of facilitating communication between one or more components of a computing device. Examples of communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In some embodiments, memory controller 818 may include a Direct Memory Access (DMA) unit that may transfer data (e.g., packets) to or from a link adapter.

I/O controller 820 generally represents any type or form of device or module capable of coordinating and/or controlling the input and output functions of a computing device. For example, in certain embodiments I/O controller 820 may control or facilitate transfer of data between one or more elements of computing system 800, such as processor 814, system memory 816, communication interface 822, and storage interface 830.

Communication interface 822 broadly represents any type or form of communication device or adapter capable of facilitating communication between exemplary computing system 800 and one or more additional devices. For example, in certain embodiments communication interface 822 may facilitate communication between computing system 800 and a private or public network including additional computing systems. Examples of communication interface 822 include, without limitation, a link adapter, a wired network interface (such as a network interface card), a wireless network interface (such as a wireless network interface card), and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also enable computing system 800 to engage in distributed or remote computing. For example, communication interface 822 may receive instructions from a remote device or send instructions to a remote device for execution.

As illustrated in FIG. 8, exemplary computing system 800 may also include a primary storage device 832 and/or a backup storage device 834 coupled to communication infrastructure 812 via a storage interface 830. Storage devices 832 and 834 generally represent any type or form of storage device or medium capable of storing data and/or other computer-readable instructions. For example, storage devices 832 and 834 may represent a magnetic disk drive (e.g., a so-called hard drive), a solid state drive, a floppy disk drive, a magnetic tape drive, an optical disk drive, a flash drive, or the like. Storage interface 830 generally represents any type or form of interface or device for transferring data between storage devices 832 and 834 and other components of computing system 800.

In certain embodiments, storage devices 832 and 834 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 834 may also include other similar structures or devices for allowing computer software, data, or other computer-readable instructions to be loaded into computing system 800. For example, storage devices 832 and 834 may be configured to read and write software, data, or other computer-readable information. Storage devices 832 and 834 may be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from those shown in FIG. 8. Computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying a route installed in a forwarding information base of a network device;
   identifying a plurality of active paths that lead from the network device to a destination device of the route installed in the forwarding information base;
   determining a load distribution of the plurality of active paths by calculating a plurality of traffic loads that represent amounts of traffic that traverse from the network device to the destination device via the plurality of active paths, wherein calculating the plurality of traffic loads comprises calculating a plurality of overall computed weights for a plurality of final hops included in the plurality of active paths;
   generating an abridged representation of the load distribution that identifies the route and the plurality of overall computed weights and omits at least one hop included in the plurality of active paths; and
   making a trafficking decision in connection with the plurality of active paths based at least in part on the load distribution of the plurality of active paths.

2. The method of claim 1, wherein the trafficking decision comprises at least one of:
   a load-balancing decision for the plurality of active paths; and
   a traffic engineering decision in connection with the plurality of active paths.

3. The method of claim 2, wherein making the load-balancing decision comprises:
   determining that at least portion of the load distribution of the plurality of active paths exceeds a certain threshold; and
   in response to determining that the portion of the load distribution exceeds the certain threshold, modifying the load distribution of the plurality of active paths by increasing an amount of traffic handled by at least one of the active paths and decreasing an amount of traffic handled by at least another one of the active paths.

4. The method of claim 2, wherein making the load-balancing decision comprises:
   determining that a current state of the load distribution of the plurality of active paths complies with a certain threshold; and
   in response to determining that the load distribution complies with the certain threshold, maintaining the load distribution of the plurality of active paths in the current state.

5. The method of claim 1, wherein identifying the plurality of active paths that lead from the network device to the destination device comprises:
   searching the forwarding information base for information that identifies each node included in the plurality of active paths;
   during the search, finding the information that identifies each node included in the plurality of active paths within the forwarding information base; and
   generating a representation of the plurality of active paths based at least in part on the information found within the forwarding information base.

6. The method of claim 1, wherein identifying the plurality of active paths that lead from the network device to the destination device comprises identifying each node included in the plurality of active paths by:
   accessing, in the forwarding information base, a unilist entry that identifies a list of unicast next hops included in the plurality of active paths that lead from the network device to the destination device; and
   identifying, based at least in part on the unilist entry accessed in the forwarding information base, the unicast next hops included in the plurality of active paths.

7. The method of claim 6, wherein:
   the unilist entry identifies each node included in the plurality of active paths; and
   identifying the unicast next hops included in the plurality of active paths comprises determining, based at least in part on the unilist entry accessed in the forwarding information base, each node included in the plurality of active paths.

8. The method of claim 1, wherein determining the load distribution of the plurality of active paths comprises:
   obtaining, from the forwarding information base, information that identifies a balance value for each node included in the plurality of active paths; and calculating the plurality of traffic loads based at least in part on the balance value for each node included in the plurality of active paths.

9. The method of claim 8, wherein calculating the plurality of traffic loads comprises:
   initializing a propagated traffic ratio for the plurality of active paths;
   identifying a first active path included in the plurality of active paths;
   identifying a balance value for a next hop of the first active path; and
   calculating an overall computed weight for the next hop included in the first active path by:
      multiplying the propagated traffic ratio for the plurality of active paths by the balance value for the next hop; and
      dividing a product of the propagated traffic ratio and the balance value for the next hop by a sum of all balance values for all next hops included in the plurality of active paths.

10. The method of claim 9, wherein calculating the plurality of traffic loads comprises:
   identifying the overall computed weight for the next hop included in the first active path;
   identifying a balance value for a subsequent hop of the first active path; and
   calculating an overall computed weight for the subsequent hop included in the first active path by:
      multiplying the overall computing weight for the next hop by the balance value for the subsequent hop; and
      dividing a product of the overall computing weight for the next hop and the balance value for the subsequent hop by a sum of all balance values for all next-to-next hops included in the plurality of active paths.

11. The method of claim 1, wherein making the trafficking decision comprises making the trafficking decision based at least in part on the abridged representation of the load distribution.

12. The method of claim 1, further comprising storing the abridged representation of the load distribution in the forwarding information base for future reference.

13. The method of claim 1, wherein identifying the plurality of active paths comprises identifying at least one inactive path that leads from the network device to the destination device by:
   identifying weight values for the plurality of active paths and the inactive path;
   comparing the weight value for the inactive path to the weight values for the plurality of active paths;
   determining, based at least in part on the comparison, that the weight value for the inactive path differs from the weight values for the plurality of active paths; and
   determining, based at least in part on the comparison, that that the weight value for the inactive path indicates that the inactive path is not currently carrying any traffic from the network device to the destination device.

14. A system comprising:
   an identification module, stored in memory, that:
      identifies a route installed in a forwarding information base of a network device; and
      identifies a plurality of active paths that lead from the network device to a destination device of the route installed in the forwarding information base;
   a computation module, stored in memory, that calculates a plurality of traffic loads that represent amounts of traffic that traverse from the network device to the destination device via the plurality of active paths;
   a determination module, stored in memory, that determines a load distribution of the plurality of active paths by calculating a plurality of traffic loads that represent amounts of traffic that traverse from the network device to the destination device via the plurality of active paths, wherein calculating the plurality of traffic loads comprises calculating a plurality of overall computed weights for a plurality of final hops included in the plurality of active paths;
   a record module, stored in memory, that generates an abridged representation of the load distribution that identifies the route and the plurality of overall computed weights and omits at least one hop included in the plurality of active paths;
   wherein the determination module further makes a trafficking decision in connection with the plurality of active paths based at least in part on the load distribution of the plurality of active paths; and
   at least one physical processor configured to execute the identification module, the computation module, and the determination module.

15. The system of claim 14, wherein the trafficking decision comprises at least one of:
   a load-balancing decision for the plurality of active paths; and
   a traffic engineering decision in connection with the plurality of active paths.

16. The system of claim 15, wherein the determination module makes the load-balancing decision by determining that at least portion of the load distribution of the plurality of active paths exceeds a certain threshold; and
   further comprising a trafficking module, stored in memory, that modifies the load distribution of the plurality of active paths in response to the determination that the portion of the load distribution exceeds the certain threshold by:
      increasing an amount of traffic handled by at least one of the active paths; and
      decreasing an amount of traffic handled by at least another one of the active paths.

17. The system of claim 15, wherein the determination module makes the load-balancing decision by:
   determining that a current state of the load distribution of the plurality of active paths complies with a certain threshold; and
   in response to determining that the load distribution complies with the certain threshold, maintaining the load distribution of the plurality of active paths in the current state.

18. The system of claim 14, wherein the identification module identifies the plurality of active paths that lead from the network device to the destination device by:
   searching the forwarding information base for information that identifies each node included in the plurality of active paths; and
   during the search, finding the information that identifies each node included in the plurality of active paths within the forwarding information base; and
   further comprising a record module, stored in memory, that generates a representation of the plurality of active paths based at least in part on the information found within the forwarding information base.

19. An apparatus comprising:
   a storage device that stores a forwarding information base that includes a plurality of routes that lead from a network device to a plurality of destination devices; and at least one physical processor communicatively coupled to the storage device, wherein the physical processor:
identifies a route installed in a forwarding information base of a network device;
identifies a plurality of active paths that lead from the network device to a destination device of the route installed in the forwarding information base;
determines a load distribution of the plurality of active paths by calculating a plurality of traffic loads that represent amounts of traffic that traverse from the network device to the destination device via the plurality of active paths, wherein calculating the plurality of traffic loads comprises calculating a plurality of overall computed weights for a plurality of final hops included in the plurality of active paths;
generates an abridged representation of the load distribution that identifies the route and the plurality of overall computed weights and omits at least one hop included in the plurality of active paths; and
makes a trafficking decision in connection with the plurality of active paths based at least in part on the load distribution of the plurality of active paths.

20. The apparatus of claim 19, wherein the trafficking decision comprises at least one of:
a load-balancing decision for the plurality of active paths; and
a traffic engineering decision in connection with the plurality of active paths.

* * * * *